July 6, 1954   O. J. POUPITCH   2,682,693
MOLDING CLIP
Filed Oct. 21, 1952
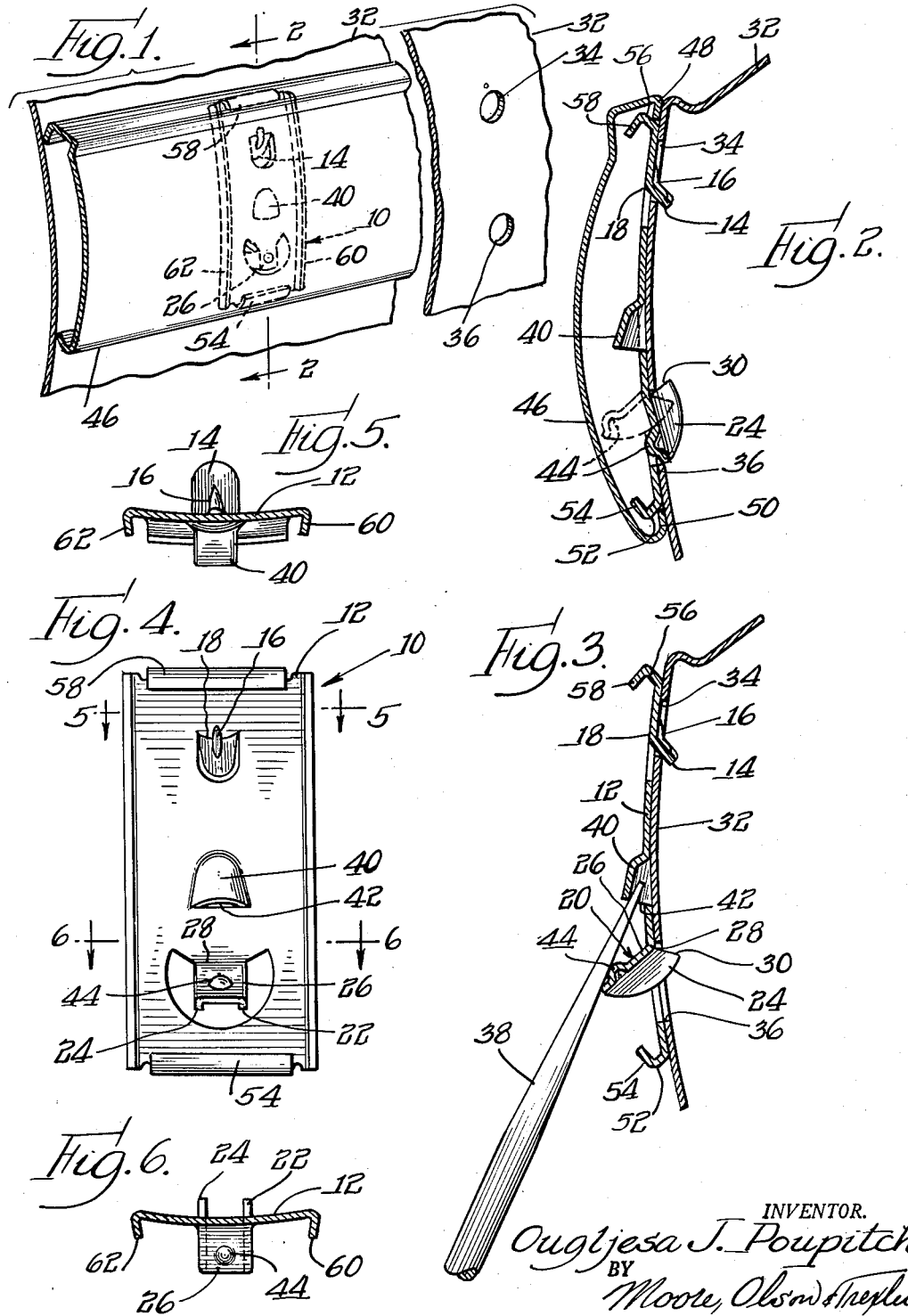
INVENTOR.
Ougljesa J. Poupitch
BY
Moore, Olson & Trexler
attys.

Patented July 6, 1954

2,682,693

UNITED STATES PATENT OFFICE 2,682,693

MOLDING CLIP

Ougljesa Jules Poupitch, Chicago, Ill., assignor to Illinois Tool Works, Chicago, Ill., a corporation of Illinois Application October 21, 1952, Serial No. 315,910

6 Claims. (Cl. 24—73)

The present invention relates to a fastener, and more particularly to a fastener of the type adapted to secure a molding to a work piece.

In the past, numerous types of fasteners have been employed to secure moldings, and these prior art fasteners have been subject to several disadvantages, which disadvantages include inadequate holding power of the fastener to the work piece, especially when such fasteners are utilized to mount decorative moldings on automobile panels, which are subjected to road shocks. In addition, it has often been difficult to assemble prior art fasteners with the work piece, and it has been difficult and expensive to manufacture such prior art devices.

An object of the present invention is to provide a novel fastener which may be quickly and economically manufactured from sheet material by utilizing simple bending and stamping processes.

Another object of the present invention is to provide a novel fastener of the above described type, which fastener includes improved means for positively and securely gripping the work piece, so that the holding power of the fastener is substantially increased.

Still another object of this invention is to provide a novel fastener having the above described characteristics, which novel fastener may be quickly and easily assembled with a work piece.

A more specific object of this invention is to provide a novel fastener of the above described type, which fastener is formed so that a simple tool may be readily applied thereto for securing the fastener to a work piece.

Other objects and advantages of the present invention will become apparent from the following descrpition and the accompanying drawings, wherein:

Fig. 1 is a perspective view, showing a molding mounted on a work piece by a novel fastener which embodies the principles of this invention;

Fig. 2 is a vertical cross section taken along line 2—2 in Fig. 1;

Fig. 3 is a vertical cross section taken along the same line as Fig. 2 and shows the novel fastener of this invention in an intermediate stage of assembly with a work piece;

Fig. 4 is a plan view of the novel fastener of this invention;

Fig. 5 is a cross section taken along line 5—5 in Fig. 4; and

Fig. 6 is a cross section taken along line 6—6 in Fig. 4.

Referring now more specifically to the drawings, wherein like parts are designated by the same numerals throughout the various figures, a fastener 10 involving the principles of this invention is shown best in Figs. 1 and 4. The fastener 10 is preferably constructed of an integral sheet material blank, which blank may be of any suitable material, such as steel.

The fastener 10 includes a body section or member 12 which is preferably in the form of an elongated rectangle. A tongue or finger 14 is struck from the body section adjacent one end thereof for a purpose to be described more fully below. Preferably, the finger 14 is formed with a transverse concavo-convex cross section in order to increase the rigidity thereof. As shown in Figs. 2, 3, 4, and 5, a short bead 16 is formed so that it extends longitudinally of the finger and across the junction line 18 of the finger and the body section to reinforce this junction.

Adjacent the end of the body section, opposite from the finger 14, material is struck from the body section and formed to provide a securing unit 20. The securing unit includes a pair of wings 22 and 24, which are joined together by a foldable cross section 26, as shown best in Figs. 4 and 6. The foldable cross section 26 is integrally joined to the body section along bend line 28, so that the securing unit may be folded from the open position shown in dotted lines in Fig. 2 to the closed securing position shown in solid lines in Fig. 2. As shown best in Fig. 3, the wing 24 is provided with a work piece engaging edge 30 which faces inwardly toward the mid portion of the body section. This work piece engaging edge is formed so that it is inclined at an acute angle to the plane of the foldable cross section 26 of the securing unit so that when the securing unit is in the open position shown in Fig. 3, the work piece engaging edge 30 extends forwardly or outwardly away from the mid portion of the body section, and when the securing unit is in the closed position shown in Fig. 2, the edge 30 extends inwardly toward the mid portion of the body section. The wing 22 is provided with a work piece engaging edge which is constructed and arranged similarly to the edge 30. It should be noted that the wings are formed so that their lower edges are curved in a manner whereby the distance the wings extend from the foldable cross section 26 increases from the outer free end of the cross section to the inner end thereof. By this structure, the material required to be struck from the body section 12 is reduced, and, in addition, the size of an aperture in a work piece through which the wings extend, as described more fully hereinbelow, may be reduced to a minimum.

A work piece 32 to which the fastener of this invention may be secured is shown best in Figs. 1, 2, and 3. This work piece is provided with a pair of spaced apertures 34 and 36 adapted to receive the securing finger 14 and the securing wings 22 and 24 of the fastener. In the illustrated embodiment of this invention, the work piece 32 is shown as a curved portion of an automobile body panel, and, therefore, the body section of the fastener is curved to conform with the work piece. However, it should be understood that the body section of the fastener may be substantially flat and that the fastener may be applied to a substantially flat work piece.

When mounting the fastener of this invention to the work piece, the securing unit is first moved to the open position shown in Fig. 3 and in dotted lines in Fig. 2. However, it should be understood that as a practical matter, the fasteners will generally be sent to the consumer with the securing units 20 already deformed or moved to the open position. The finger 14 is then inserted through the aperture 34 in the work piece until the convex side of the finger engages the edge of the aperture. It should be noted that the finger extends inwardly from its connection with the body section or member 12 toward the mid section of the body section so that the finger hooks beneath the under surface of the work piece. The securing unit 20 is then deformed or bent to the closed position, which movement causes the work piece engaging edges of the fingers to move generally toward the finger 14 and engage the edge of the aperture 36 so that the work piece is securely clamped between the finger 14 and the work piece engaging edges of the wings. It should be noted that the finger and the edges of the two wings provide a three-point clamping contact with the work piece so that any possibility of the fastener slipping relative to the work piece is substantially eliminated.

In order to enable the securing unit 20 to be quickly and easily deformed inwardly towards its closed position by means of a simple straight tool, such as the tool 38, a cowl-like protuberance 40 is struck outwardly from a mid portion of the body section. The cowl-like protuberance 40 is provided with an open mouth 42 through which the end of the tool may be inserted. Then by pressing down on the tool, the tool pivots about its end, which is anchored within the cowl-like protuberance 40 to force the securing unit 20 downwardly. It should be noted that the cross section 26 of the securing unit is provided with a raised abutment means or bead 44 for engagement by the tool 28. This bead 44 not only strengthens the portion of the cross section 20 to which pressure is applied by the tool, but also enables the securing unit to be forced inwardly until the cross section lies below the plane of the body section 12, as shown in Fig. 2, whereby to assure a secure clamping action by the wings.

After the fastener has been secured to the work piece, a molding 46 having inturned flanges 48 and 50 along its longitudinal edges is snapped onto the fastener. In order to retain the molding, one end of the body section is formed with an upturned and outwardly extending flange 52 which is adapted to overlie the inturned flange 50 of the molding. The flange 52 terminates in an upwardly and inwardly directed hook portion 54 which is adapted to guide the flange 50 of the molding over the end of the fastener flange 52 and into the desired secured position. The opposite end of the fastener is provided with a similar molding securing flange which includes an upwardly and outwardly extending portion 56 and an upwardly and inwardly extending terminal hook portion 58.

The fastener of this invention is preferably constructed from an integral blank of relatively soft sheet steel. In order to provide sufficient rigidity to the back section 12, it is desirable to form the longitudinal marginal portions of the back section into outturned rigidifying flanges 60 and 62, as shown best in Figs. 5 and 6.

From the above description, it is seen that the present invention provides a novel fastener which may be easily and economically manufactured from an integral blank of sheet material by means of simple stamping and bending operations. Furthermore, it may be seen that because of the particular formation of the work engaging edges of the wings, the fastener may be quickly and easily applied to the work piece and thereafter securely clamped to the work piece. In addition, it should be noted that the work piece engaging surfaces of the fingers and the wings work so as to pull or clamp the body section or member 12 of the fastener against the portion of the work piece disposed between the apertures, thereby to reinforce said portion of the work piece between the apertures. It may also be seen that because of the novel formation of the improved fastener of this invention, the securing unit 20 may be readily deformed into clamping position by means of a pressing action provided by a simple tool and without any pounding, which might injure a work piece such as a relatively thin panel of an automobile.

While the preferred embodiment of the present invention has been shown and described herein, it is obvious that many changes may be made in the structural details of the illustrated fastener without departing from the spirit and scope of the appended claims.

I claim:

1. A one piece fastener for mounting on a work piece, comprising a sheet material body member, a finger-like projection struck from said body member and extending laterally therefrom, securing means struck from said body member, said securing means including a foldable section integrally joined with said body member along a bend line and extending from said bend line away from said finger-like projection and adapted to be moved from an open position extending laterally from a side of said body member opposite said projection toward a closed position generally in the plane of said body member, and a wing-like element projecting laterally from said foldable section and having a work piece engaging edge generally facing said finger-like projection so as to clamp a work piece between said edge and said projection when the foldable section is moved to its closed position.

2. A one piece fastener, as defined in claim 1, wherein said work piece engaging edge of the wing-like element extends at an obtuse angle to the foldable section so that said edge is inclined toward the finger-like projection when the foldable section is moved substantially to the closed position.

3. A one piece fastener, as defined in claim 1, wherein said securing means includes a pair of wing-like elements, and each of which wing-like elements includes a work piece engaging edge facing generally toward said finger-like projection.

4. A one piece fastener, as defined in claim 1, which includes anchor means on said body member and disposed laterally of said foldable section for pivotally securing an end of a tool utilized for moving the foldable section toward said closed position, and raised abutment means on said foldable section for engagement by said tool so that said foldable section may be readily pressed to a fastener securing position substantially in the plane of said body member.

5. A fastener, as defined in claim 1, which includes said finger-like projection having a concavo-convex transverse cross section, and the convex side of said finger-like projection facing generally toward said securing means.

6. A one piece fastener for mounting on a work piece, comprising a sheet material body member, projection means struck from said body member and extending laterally of one side of the body member, a foldable section struck from said body member, said foldable section integrally joining said body member along a bend line and extending from said bend line laterally of a side of the body member opposite said one side and away from said projection means, said body member including an integral intermediate section between and in alignment with said foldable section and said projection means, and wing-like means integral with and extending laterally from said foldable section and outwardly of said one side of the body member, said wing-like means having a work piece engaging surface extending from a point adjacent said bend line and generally facing said projection means so that upon inward movement of the foldable section said surface is moved toward said projection means to clamp the work piece between said surface and said projection means and to draw said intermediate section against said work piece.

References Cited in the file of this patent

UNITED STATES PATENTS

| Number | Name | Date |
| --- | --- | --- |
| 2,337,239 | Hall | Dec. 21, 1943 |
| 2,476,207 | Brown | July 12, 1949 |
| 2,588,251 | Kost | Mar. 4, 1952 |
| 2,611,166 | Wiley | Sept. 23, 1952 |
| 2,653,687 | Churchill | Sept. 29, 1953 |

FOREIGN PATENTS

| Number | Country | Date |
| --- | --- | --- |
| 427,187 | Great Britain | Apr. 17, 1935 |